United States Patent [19]

Sotirianos

[11] Patent Number: 5,143,525
[45] Date of Patent: Sep. 1, 1992

[54] PROCESS AND APPARATUS FOR BREAKING UP FOAM INTO ITS LIQUID AND GASEOUS COMPONENTS

[75] Inventor: Konstantin Sotirianos, Stäfa, Switzerland

[73] Assignee: Chemap AG, Volketswil, Switzerland

[21] Appl. No.: 719,825

[22] Filed: Jun. 24, 1991

[30] Foreign Application Priority Data

Jun. 29, 1990 [DE] Fed. Rep. of Germany ....... 4020645

[51] Int. Cl.[5] ............................................. B01D 19/00
[52] U.S. Cl. ........................................ 55/52; 55/178; 55/184; 55/203
[58] Field of Search ............... 55/45, 52, 178, 184, 55/201, 203

[56] References Cited

U.S. PATENT DOCUMENTS

| | | | |
|---|---|---|---|
| 2,564,765 | 8/1951 | Mercier | 55/178 |
| 3,501,414 | 3/1970 | Mueller | 55/178 X |
| 3,560,402 | 2/1971 | Kilborn et al. | 55/178 X |
| 3,577,868 | 5/1971 | Muller | 55/178 |
| 3,616,260 | 10/1971 | Müller | 55/178 X |
| 3,649,557 | 3/1972 | Freedman et al. | 55/178 |
| 3,693,325 | 9/1972 | Muller | 55/178 |
| 4,084,946 | 4/1978 | Burgess | 55/184 |
| 4,110,089 | 8/1978 | Müller | 55/178 |
| 4,139,350 | 2/1979 | Sotirianos | 55/178 X |
| 4,365,977 | 12/1982 | Egbert | 55/52 X |
| 4,373,024 | 2/1983 | Hunt | 55/178 X |

FOREIGN PATENT DOCUMENTS

| | | | |
|---|---|---|---|
| 0718802 | 3/1942 | Fed. Rep. of Germany | 55/178 |
| 0736501 | 6/1943 | Fed. Rep. of Germany | 55/178 |
| 3519374 | 1/1987 | Fed. Rep. of Germany | 55/178 |
| 1133484 | 3/1957 | France | 55/178 |
| 0615100 | 1/1980 | Switzerland | 55/178 |
| 0676607 | 7/1979 | U.S.S.R. | 55/178 |
| 1271539 | 11/1986 | U.S.S.R. | 55/178 |

*Primary Examiner*—Robert Spitzer
*Attorney, Agent, or Firm*—Michael J. Striker

[57] ABSTRACT

A process of breaking up a foam into a liquid component and a gaseous component by action of centrifugal forces, includes drawing the foam axially into a centrifugal fan device by suction; then, accelerating the foam radially by centrifugal forces over a plurality of ribs and/or baffles, forcing the liquid component through a peripheral liquid discharge outlet; feeding the gaseous component through at least one gas outlet prior to forcing the liquid component through the liquid discharge outlet; advantageously feeding the gaseous component in a radial direction opposite to that in which the foam flows in the fan device, and after that, conducting the gaseous component axially through a gas outlet. The apparatus for performing the process includes a centrifugal fan acting as a pump impeller having an upper plate and a lower plate connected by a plurality of ribs and a conical cutoff cover located above the centrifugal fan acting to guide gas component flow, an axially-located foam inlet, a gas component outlet located above the cutoff cover near the rotation axis of the fan and a liquid discharge outlet formed between the cutoff cover and the lower plate at the periphery of the centrifugal fan.

30 Claims, 3 Drawing Sheets

PROCESS AND APPARATUS FOR BREAKING UP FOAM INTO ITS LIQUID AND GASEOUS COMPONENTS

BACKGROUND OF THE INVENTION

The present invention relates to a process and apparatus for breaking up a foam into its liquid and gaseous components under the action of centrifugal forces.

Advantageously, for production of centrifugal forces a centrifugal device with a gas outlet is used.

This type of process and apparatus for breaking up a foam is known and described in the Swiss Pat. No. 615 100. This known mechanical process of foam separation breaks the foam up into its liquid and gaseous components by action of centrifugal force.

The apparatus comprises a centrifugal fan device including two parallel disks between which radial or tangentially arranged baffle plates of different shapes are attached. The spacing between both disks is larger than their diameter. The centrifugal fan device is driven by an electric motor. An opening is provided in the upper disk concentric to the drive axis as a gas outlet.

The foam enters the centrifugal fan device at the periphery of the device for the foam destruction. The heavier liquid component of the foam is flung back by centrifugal force, while the lighter, gaseous component is released from the device through the gas outlet.

The foam separation has the disadvantage that it is inefficient in the case of comparatively large amounts of foam and stable foams. Because of that, there is a comparatively higher energy consumption and the danger exists that the foam also will issue from the gas outlet.

SUMMARY OF THE INVENTION

It is an object of the present invention to provide a process for breaking up or separating a foam into its components with a minimum energy consumption.

It is also an object of the present invention to provide a process for breaking up a foam into its components, which has a high degree of separation ability and is not susceptible to operational problems, but is also efficient in regard to the consumption of energy.

It is another object of the present invention to provide an apparatus for performing the process of the invention, which is also a compact and an energy efficient apparatus.

According to the invention, the gaseous component is conducted away through at least one gas outlet before the baffled liquid component is forced out through a liquid discharge outlet.

Unexpectedly, the liquid-gas mixture already is separated by suction. This can be explained by the following: the lighter gaseous components of the foam are accelerated upwardly by the suction force, while the liquid, heavier components settle. Because of that the efficiency of the foam breaking up apparatus is increased and the energy consumption required is correspondingly reduced. Probably the superiority of the process according to the invention in contrast to the known process results, because a definite flow direction is imparted to the foam and results in larger shear forces, which mechanically break up the membranes formed in the foam.

The liquid components forced out through the liquid discharge outlet can be guided against baffle surfaces for an improved separation. Since the liquid component exits from the discharge outlet, it impinges, after a free flow phase, on baffle surfaces, from which it comes off and as much as possible of the residual gas escapes.

When the foam is drawn through the inlet pipe, the rising foam can be separated into its components, also during filling of a container, and the foam height can be effectively influenced.

In an additional embodiment of the method for breaking up the foam, the gaseous component is fed radially opposite to the flow direction of the foam, advantageously under action of a centrifugal force field. In this way an even sharper separation is obtained, since liquid particles travelling with the gas flow are separated from the gas flow.

The feature, that the gaseous component is conducted axially, results in an advantageously long path of flow for the gas under the action of centrifugal forces and the sharpness of the separation is improved by that.

The additional feature, that a separated portion of the liquid component is fed back to the foam being drawn in the centrifugal fan device, allows it to be separated with the liquid components, if necessary removing air bubbles by repeated treatments.

The foam breaking up action of the method can be still further increased, when the foam and/or at least one of the separate components is additionally exposed to shear forces.

For improvement of the separation sharpness and for increasing of the foam decomposition effectiveness the separated components are subjected to an additional separation of their components.

For performing the process according to the invention an apparatus for decomposition of the foam comprises a centrifugal fan device having a centrifugal fan, in which the centrifugal fan is formed like a rotatably driven pump impeller. This centrifugal fan device has a gas outlet, a liquid discharge outlet arranged in the vicinity of the centrifugal fan periphery and an inlet for foam arranged on the axis of the device. The gas outlet is arranged at the center of the centrifugal fan device like the inlet.

When baffle surfaces are provided in the apparatus in the vicinity of the liquid discharge outlet, an additional improvement in the separation results occurs.

Also with reduced filling height of a container the foam can be decomposed into its components, if the inlet is formed like a pipe, advantageously height adjustable.

The pump impeller provides for an advantageously high foam flow through the apparatus with reduced energy requirements. When cutoff cover, which is advantageously conical, is located above the pump impeller, the gaseous component is collected satisfactorily and fed out axially.

In another embodiment of the apparatus of our invention, the pump impeller or centrifugal fan device, has an upper and lower plate, between which a plurality of ribs are provided. This type of centrifugal fan device has proven to be particularly efficient in practice and may be economically manufactured without special construction costs.

The form, in which the upper plate has a plurality of outlets for the gaseous component, which are formed like orifices, provides an increased flow speed at the throttled orifice cross section, so that probably, because of the increased force of gravity, the sharpness of the separation is improved.

The feed of foam to the apparatus is particularly easy, when the lower plate has an axial opening acting as an inlet and, advantageously, forms a throttling gap with the cutoff cover periphery.

When additional ribs are located between the upper plate and the cutoff cover in another form of our invention, the sharpness of the separation and the effectiveness of the foam breaking up action of the apparatus is improved.

When the throttling gap and/or the outlet opening are variable, the apparatus may be used with very different types of foam. According to the consistency, viscosity and stability or strength of the foam, the desirable operating parameters can be found by experiment by variation of the throttling action at the outlet of the gaseous component and/or the liquid component.

The apparatus is particularly easily constructed, when the cutoff cover and the centrifugal fan device are formed as a commonly rotating unit. The feature, that the plates or ribs and/or the cutoff cover are movable relative to each other about a common rotation axis, and/or the cutoff cover is advantageously stationary, increases the foam breaking up ability of the apparatus, since, because of the relative motion so imparted, additional shear forces are applied to the foam, which tear apart the gas bubble membranes. The relative motion mentioned above is particularly easily attained, when the cutoff cover is stationary.

The operation of the apparatus according to the invention is advantageously made automatic by a suitable adjusting element, when it has a drive and or a throttling gap, which is advantageously controllable.

The throughput and the sharpness of the separation are advantageously increased, when several plates with gas separating outlets are positioned above one another.

BRIEF DESCRIPTION OF THE DRAWING

The objects, features and advantages of the present invention will now be illustrated in more detail by the following detailed description, reference being made to the accompanying drawing in which.

PREFERRED EMBODIMENTS OF THE INVENTION

Figure 1:
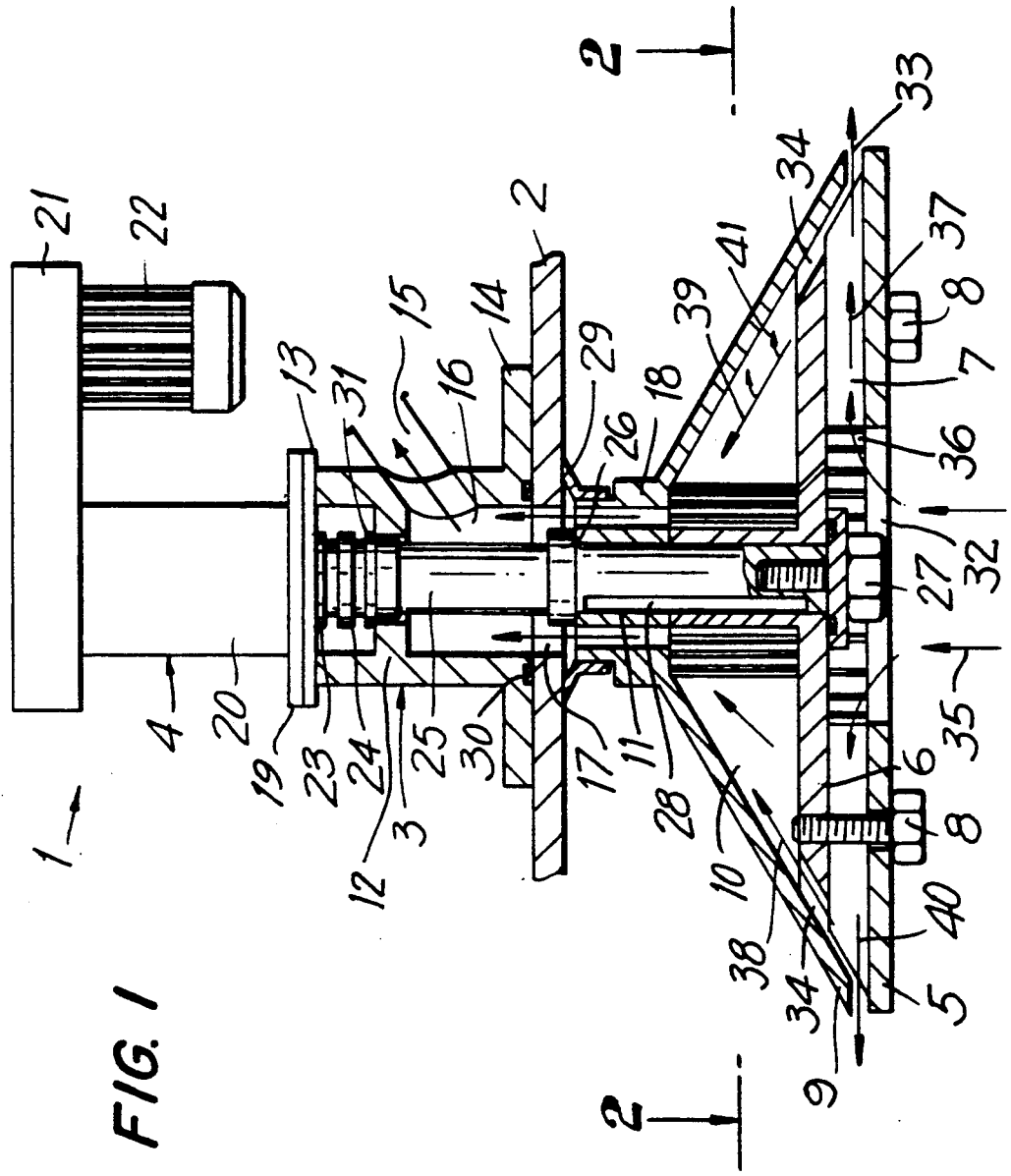
FIG. 1 is an axial cross sectional view through an apparatus according to the invention for breaking up the foam, the cross section being taken along the section line 1—1 of FIG. 2.
Figure 2:
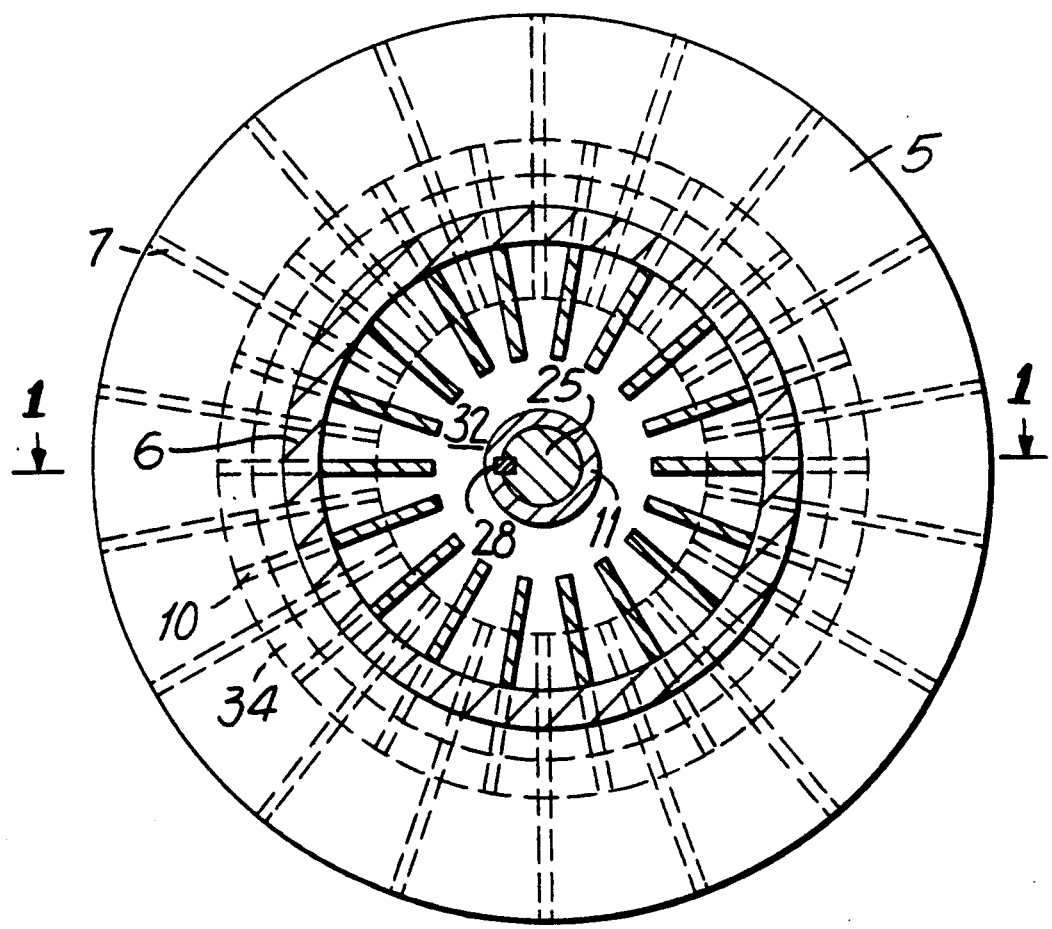
FIG. 2 is a transverse cross sectional view through the apparatus shown in FIG. 1 taken along the section line 2—2 of FIG. 1.

In FIG. 1, a foam breaking up device 1 in a container is shown. Only one wall 2 of this container is partially indicated in FIG. 1. Moreover, the foam breaking up device 1 has a connected drive unit 4, which is mounted outside the container 2 with a bracket 3.

A lower plate 5 and an upper plate 6 are located in a lower portion of the foam breaking up device 1. A plurality of ribs 7 span the space between the plates 5, 6. The lower plate 5, the upper plate 6 and the ribs 7 are joined into a single structural unit by the threaded bolts 8. Above the plates 5, 6 a conical cutoff cover 9 is located. Additional ribs 10 are provided between the cutoff cover 9 and the upper plate 6. The cutoff cover 9 is rigidly attached to the shaft sleeve 11.

The bracket 3, whose cylindrical housing portion 12 has an upper flange 13 and a lower flange 14, is located outside of the wall 2. The bracket 3 is attached to the container wall 2 with the lower flange 14 by unshown mounting bolts. A connector pipe 15 extends from the cylindrical housing 12. This connector pipe 15 communicates with the interior of the container by the inner chamber 16 of the cylindrical housing portion 12 and opening 17 of the container wall 2 and a pipe-like extension 18 of the cutoff cover 9. The upper flange 13 serves for attachment of a corresponding opposing flange 19 of the drive unit 4 mounted on the bracket 3. The drive unit 4 includes the gear unit 20 with the transmission gear 21 and drive motor 22.

The drive energy of the motor 22 is transmitted by the drive shaft 23 via coupling 24 to the shaft 25. The shaft sleeve 11 of the upper plate 6 is plugged onto this shaft 25 and extends up to the shaft collar 26. This shaft sleeve 11 is held axially fixed by the threaded bolt 27. For transferring the torque between the drive shaft 25 and the shaft sleeve 11 a spring element 28 is provided.

The cutoff cover 9 is sealed from the container wall 2 by the sealing sleeve 29. The interior chamber 16 of the cylindrical housing portion 12 is sealed at the container wall by sealing ring 30 and at the drive coupling 24 by sealing ring 31.

The lower plate 5 has a central opening 32 as inlet for the foam/liquid mixture. The outer peripheral edges of the cutoff cover 9 forms together with the outer peripheral edge of the lower plate 5 a throttling gap 33 for the outflow of liquid components, i.e. the liquid discharge outlet. Additional ribs 10 are located between the upper plate 6 and the cutoff cover 9. Gas outlet 34 in the upper plate 6 connects the space between the plates 5, 6 with the space, in which the additional ribs 10 are located.

The foam and/or the foam-liquid mixture flows in the axial direction shown by the arrow 35 through the central opening 32 of the lower plate 5 into the intermediate space between the lower plate 5 and the upper plate 6. There the foam is guided in the direction shown by arrow 36 and is accelerated centrifugally in the radial direction shown by the arrow 37. The foam is broken up on the ribs 7 and on the upper cutoff cover 9, in the throttling gap 33 and in the gas outlet opening 34. The gaseous lighter component issues through the orifice-like gas outlets 34 in the direction shown by arrow 38 into the intermediate space between the upper plate 6 and the cutoff cover 9, while the heavy fluid component is fed through the throttling gap 33 in the direction shown by arrow 40 to the outside. Liquid droplets travelling with the gaseous component are accelerated through it radially in the direction of the arrow 41 toward the cutoff cover 9 and then similarly are conveyed out of the device through the throttling gap 33. The gaseous component initially moving in the direction shown by arrow 39 travels through the pipe-like extension finally into the space 16, to the outlet pipe 15 from which it leaves the centrifugal fan device and enters an unshown conduit system.

Figure 3:
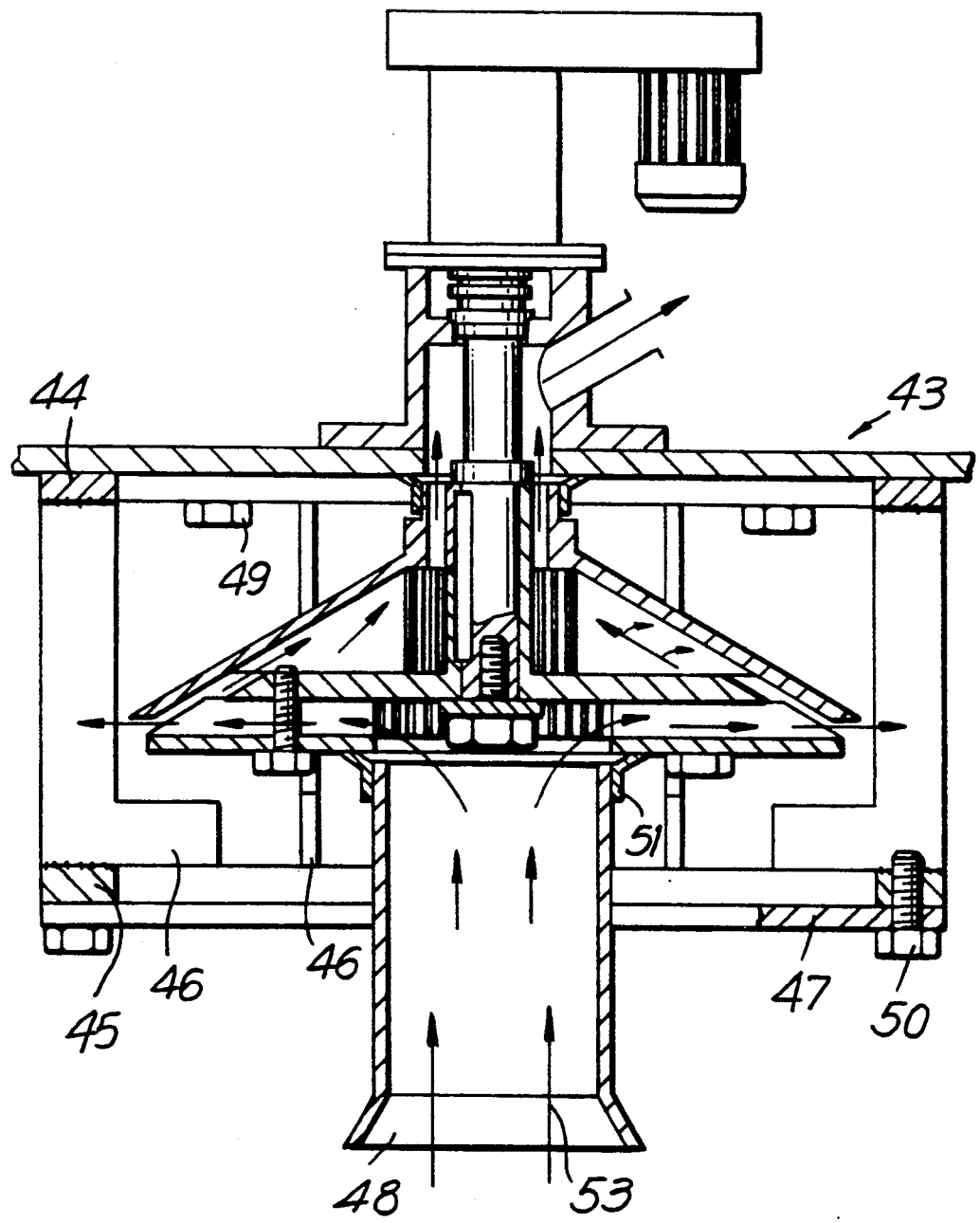
FIG. 3 is an axial cross sectional view of an apparatus according to the invention with additional baffle surfaces and a suction pipe.

In FIG. 3 the previously described apparatus is equipped with an additional structural unit 43, which comprises an upper ring 44, a lower ring 45 and the transverse members 46 extending between them and a suction pipe 48 held by an additional ring 47. The upper ring 44 is attached by the threaded bolts 49 to the container walls 2. The transverse members 46 join both rings 44 and 45 in a single unit, since they are connected by a weld seam at their ends with the rings.

The ring 47, in whose central opening the pipe 48 is welded, is attached by the threaded bolts 50 to ring 45. The upper end of the suction pipe 48 is sealed by the sealing collar 51 from the lower plate 5, so that the foam-liquid mixture enters through the lower opening of the suction pipe 48 in the direction of the arrow 52. The liquid accelerated in the direction of the arrow 53 impinges on the transverse members 46, so that its surface acting as baffle surface assists in the separation of the foam into its components.

While the invention has been illustrated and described as embodied in a process and apparatus for decomposition of a foam into its gaseous and liquid components, it is not intended to be limited to the details, shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In a process of breaking up a foam into a liquid component and a gaseous component by action of centrifugal forces, comprising drawing the foam in one axial direction by suction and then accelerating the foam in another radial direction by action of the centrifugal forces, the improvement comprising feeding the gaseous component through at least one gas outlet prior to forcing the liquid component through a liquid discharge outlet.

2. The improvement as defined in claim 1, further comprising guiding the liquid component to be forced out of the liquid discharge outlet against baffle surfaces.

3. The improvement as defined in claim 1, further comprising drawing the foam through an inlet pipe by suction.

4. The improvement as defined in claim 1, further comprising feeding the gaseous component in a further radial direction opposite to the other radial direction in which the foam flows.

5. The improvement as defined in claim 4, wherein the gaseous component is conducted in the further radial direction by action of a centrifugal force field.

6. The improvement as defined in claim 1, further comprising conducting the gaseous component in the axial direction.

7. The improvement as defined in claim 1, further comprising feeding a separated portion of the liquid component back to the foam being drawn by suction.

8. The improvement as defined in claim 1, further comprising exposing the foam to additional shear forces.

9. The improvement as defined in claim 1, further comprising exposing at least one of the gaseous component and the liquid component to additional shear forces.

10. The improvement as defined in claim 1, further comprising subjecting at least one of the liquid component and the gaseous component to an additional separation.

11. A process of breaking up a foam by action of centrifugal forces, comprising the steps of:

a. drawing the foam into a centrifugal fan device having an axial direction and a radial direction through an inlet pipe by suction;
b. then accelerating the foam in the radial direction by action of centrifugal forces to form a gaseous component and a liquid component;
c. forcing the liquid component radially through a discharge outlet;
d. guiding the liquid component to be forced out of the liquid discharge outlet in the radial direction against baffle surfaces;
e. feeding the gaseous component through at least one gas outlet prior to forcing the liquid component through the liquid discharge outlet;
f. feeding the gaseous component in a further radial direction opposite to the radial direction in which the foam flows by action of a centrifugal force field; and
g. after the feeding of step f), conducting the gaseous component in the axial direction.

12. The improvement as defined in claim 11, further comprising feeding at least a separated portion of the liquid component back to the foam being drawn by suction.

13. The improvement as defined in claim 11, further comprising exposing at least one of the foam, the gaseous component and the liquid component to additional shear forces.

14. In an apparatus for breaking up a foam into a liquid component and a gaseous component, comprising a centrifugal fan device including a centrifugal fan having an axis and acting as a rotatably driven pump impeller, said centrifugal fan device having an inlet, a gas outlet and a liquid discharge outlet in the vicinity of the centrifugal fan periphery, the improvement wherein the inlet is located in the vicinity of the axis of the centrifugal fan and the gas outlet is located centrally relative to the centrifugal fan and in the vicinity of the axis of the centrifugal fan.

15. The improvement as defined in claim 14, further comprising baffle surfaces arranged in the vicinity of the liquid discharge outlet.

16. The improvement as defined in claim 14, wherein the inlet includes an inlet pipe of adjustable height.

17. The improvement as defined in claim 14, further comprising a cutoff cover located above the centrifugal fan, said cutoff cover acting to guide the gaseous component.

18. The improvement as defined in claim 17, wherein said cutoff cover is conical.

19. The improvement as defined in claim 17, wherein the centrifugal fan and the cutoff cover are formed as a single structural unit.

20. The improvement as defined in claim 14, wherein the centrifugal fan comprises an upper plate and a lower plate connected by a plurality of intervening rib.

21. The improvement as defined in claim 20, wherein the upper plate has a plurality of outlet openings acting as orifices.

22. The improvement as defined in claim 14, wherein said centrifugal fan comprises an upper and a lower plate connected by a plurality of intervening ribs and a cutoff cover above said centrifugal fan, wherein at least two of said upper plate and said lower plate, said ribs and said cutoff cover are moveable relative to each other about a common rotation axis.

23. The improvement as defined in claim 22, wherein the cutoff cover is stationary.

24. The improvement as defined in claim 14, further comprising a drive for the centrifugal fan.

25. The improvement as defined in claim 14, further comprising a plurality of plates arranged over each other and provided with outlet openings for the gaseous component.

26. In an apparatus for breaking up a foam into a liquid component and a gaseous component, comprising a centrifugal fan device including a centrifugal fan having an axis and acting as a rotatably driven pump impeller, said centrifugal fan device having an inlet, a gas outlet and a liquid discharge outlet in the vicinity of the centrifugal fan periphery, the improvement wherein the inlet is located in the vicinity of the axis of the centrifugal fan and the centrifugal fan comprises an upper plate and a lower plate connected by a plurality of intervening ribs and the gas outlet is located centrally relative to the centrifugal fan and in the vicinity of the axis of the centrifugal fan, having a central opening acting as at least a part of the inlet and a cutoff cover which forms a throttling gap with the lower plate at an outer peripheral edge thereof.

27. The improvement as defined in claim 26, further comprising additional ribs between the upper plate and the cutoff cover.

28. The improvement as defined in claim 26, wherein at least one of the throttling gap and the outlet openings are variable.

29. An apparatus for breaking up a foam into a liquid component and a gaseous component, comprising a centrifugal fan device including a centrifugal fan having a fan rotation axis and comprising an upper plate and a lower plate having a plurality of intervening ribs connecting the upper and the lower plates, said upper plate having a plurality of outlet openings acting as orifices for said gaseous component and said lower plate having a central opening acting as an inlet for the foam together with a inlet pipe; and said centrifugal fan device also being provided with a gas outlet located centrally relative to the centrifugal fan and in the vicinity of the fan rotation axis; and also being provided with a cutoff cover located above the centrifugal fan and extending peripherally to form a liquid discharge outlet for the liquid component together with said lower plate, and with baffle surfaces in the vicinity of said liquid discharge outlet.

30. The improvement as defined in claim 29, further comprising additional ribs between the upper plate and the cutoff cover.

* * * * *